United States Patent [19]

Yamamoto et al.

[11] Patent Number: 5,061,362

[45] Date of Patent: Oct. 29, 1991

[54] PROCESS FOR HYDROGENATION OF HEAVY OIL

[75] Inventors: Takashi Yamamoto; Toshio Itoh, both of Chiba, Japan

[73] Assignee: Research Association for Petroleum Alternatives Development, Tokyo, Japan

[21] Appl. No.: 596,577

[22] Filed: Oct. 10, 1990

Related U.S. Application Data

[63] Continuation-in-part of Ser. No. 410,334, Sep. 20, 1989, abandoned.

[30] Foreign Application Priority Data

Oct. 19, 1988 [JP] Japan .................................. 63-261397

[51] Int. Cl.$^5$ ...................... C10G 47/02; C10G 65/00
[52] U.S. Cl. ...................................... 208/108; 208/97; 208/111; 208/111 MC; 208/120; 208/120 MC; 208/143; 208/58; 208/68
[58] Field of Search ................ 208/111 MC, 120 MC, 208/97, 143, 108, 111

[56] References Cited

U.S. PATENT DOCUMENTS

| | | |
|---|---|---|
| 3,632,502 | 1/1972 | Kellrell et al. : ............. 200/111 MC |
| 3,730,878 | 5/1973 | Pollitzer ................................. 200/143 |
| 4,082,648 | 4/1978 | Murphy ................................. 200/97 |
| 4,363,719 | 12/1982 | Bousquet et al. ................... 200/111 |
| 4,666,588 | 5/1987 | Murphy ........................... 208/251 H |

FOREIGN PATENT DOCUMENTS 0145091 11/1980 Fed. Rep. of Germany ...... 200/111
54-40806 3/1979 Japan .

Primary Examiner—Helane E. Myers
Attorney, Agent, or Firm—Frishauf, Holtz, Goodman & Woodward

[57] ABSTRACT

An improved process for hydrogenation of heavy oil is provided by the use of a mixed catalyst. In the process of the present invention, a mixture of a direct desulfurization catalyst and a spent FCC catalyst which is free of molybdenum is used as the mixed catalyst. In accordance with the process of the present invention, a middle distillate fraction having a boiling point falling within the range of 171° to 343° C. can be obtained in high yield.

21 Claims, No Drawings

PROCESS FOR HYDROGENATION OF HEAVY OIL

CROSS-REFERENCE TO RELATED APPLICATION

This application is a continuation-in-part application of application Ser. No. 07/410,334 filed Sept. 20, 1989, now abandoned.

BACKGROUND OF THE INVENTION

Field of the Invention

The present invention relates to an improved process for hydrogenation of heavy oil. More particularly it is concerned with an industrially advantageous process for hydrogenation of heavy oil whereby a middle distillate fraction of high added value, such as kerosene or light oil can be produced in high yield.

In recent years, with introduction of substitute energy in the general industry or electric power field, the amount of consumption of heavy fractions such as heavy fuel oil, etc. tends to decrease. On the other hand, the amount of consumption of gasoline as a fuel for public or transportation purpose, or a middle distillate fraction such as jet fuel, korosene, light oil is increasing. The proportion of heavy oil in crude oil imported into Japan tends to increase.

Under such circumstances, it is important that an intermediate fraction such as gasoline, kerosene or light oil is efficiently produced by hydrogenating heavy oil such as atmospheric residual oil, vacuum residual oil, tar sand oil or oil shale oil.

In hydrogenation of heavy oil, catalytic activity drops as a result of deposition of carbon and undesirable metals. It is known, however, that in hydrogenation of suspension bed system using a powdery solid catalyst, deposition of carbon or metal are not so severe and thus a reduction in catalytic activity is advantageously small.

In hydrogenation of such heavy oil, it is advantageous from an economic standpoint to use a catalyst which is of high activity and inexpensive. For this reason, an attempt to use various waste catalysts used in oil refinery has been made. For example, a method using a spent FCC catalyst (U.S. Pat. No. 4,082,648) and a method using a waste direct desulfurization catalyst (Japanese Patent Kokai Koho No. 40806/1979) are disclosed.

In these spent catalysts, vanadium, nickel, etc. effective as catalyst components for hydrogenation of heavy oil are accumulated on the surface thereof. Thus they can be used as catalysts for hydrogenation of heavy oil. The method using a spent FCC catalyst, however, has disadvantages in that the activity of the waste catalyst is not sufficiently high, the amount of coke formed is large, and the yield of the desired intermediate fraction is low. In the case of the method using a spent direct desulfurization catalyst, the spent catalyst is poor in mechanical strength although it is satisfactory in respect of catalytic activity. More specifically, the attrition index of the spent direct desulfurization catalyst is about 40 wt %/30 hours (about 3 wt %/30 hours in the case of the spent FCC catalyst). Thus the loss of the catalyst due to attrition is inevitably accompanied.

SUMMARY OF THE INVENTION

The present invention is intended to overcome the aforementioned problems and an object of the present invention is to provide a process for hydrogenation of heavy oil in which an inexpensive catalyst is used and heavy oil is hydrogenated according to the suspension bed system using the inexpensive catalyst to produce an intermediate fraction of high added value, such as kerosene or light oil, in high yield, and thus the present invention is advantageous from an industrial standpoint.

It has now been found that a mixture of a direct desulfurization catalyst and a spent FCC catalyst, the FCC catalyst being free of molybedenum is inexpensive and has a high mechanical strength, and further has good activity as a catalyst for hydrogenation of heavy oil, and that if heavy oil is hydrogenated by the use of the catalyst mixture in a suspension state, the amount of coke formed is small and the desired intermediate fraction is obtained in high yield.

The present invention relates to a process for hydrogenation of heavy oil by the use of a solid catalyst suspended in the heavy oil wherein a mixture a direct desulfurization catalyst and a spent FCC catalyst, the FCC catalyst being free of molybdenum is used as the solid catalyst.

DETAILED DESCRIPTION OF THE INVENTION

There are no special limitations to the heavy oil to be used in the present invention; commonly used heavy oils such as atmospheric residual oil, vacuum residual oil, oil sand oil and oil shale oil can be used. In addition, residual oil having a boiling point of 500° C. or more can be used without diluting oil.

In the process of the present invention, a mixture of a direct desulfurization catalyst and a spent FCC catalyst, the FCC catalyst being free of molybdenum is used as the catalyst for hydrogenation. For hydrogenation of heavy oil, a method in which the reaction is carried out in such a manner that the catalyst is suspended in the heavy oil, more specifically the suspension bed system is employed. In the present invention, a fresh catalyst and a spent catalyst can be used singly or in combination as the direct desulfurization catalyst. In the case of the fresh catalyst being used, it is preferable to use a spherical one because of its good fluidity. The spent direct desulfurization catalyst is withdrawn from a direct desulfurization unit where residual oil such as atmospheric residual oil or vacuum residual oil is desulfurized as such. The catalyst to be used in direct desulfurization is not critical in type; all catalysts commonly used as direct desulfurization catalysts can be used. In general, the catalyst in which alumina is used as a support and metals such as molybdenum, cobalt, nickel and tungsten are deposited on the support singly or appropriately in combination with each other are used as direct desulfurization catalyst. In the process of the present invention, the spent direct desulfurization catalyst is desirably used after regeneration treatment for removal of carbonaceous material deposited on the surface by burning. After such regeneration treatment, 0.7 to 20 wt % of vanadium and 0.2 to 10 wt % of nickel are accumulated on the spent catalyst, and the specific surface area is usually in the range of 40 to 200 square meters per gram ($m^2$/g).

The spent FCC catalyst is withdrawn from a fluid catalytic cracking (FCC) unit. The spent FCC catalyst is free of molybdenum. The FCC catalyst is not critical in type; all catalysts commonly used as FCC catalysts can be used. For example, activated clay, synthetic silica-alumina, silica-magnesium, high alumina content silica-alumina, zeolite and so on can be used. Usually, faujasite type crystalline alumino-silicate represented by the general formula: $Na_2O.Al_2O_3.nSiO_2$, in which crystalline alluminosilicate having $SiO_2/Al_2O_3$ molar ratio of 2:5:1 is named as X-type, and crystalline alluminosilicate having $SiO_2/Al_2O_3$ molar ratio of 4.8:1 is named as Y-type. These X-type and Y-type alluminosilicate are mainly used as the FCC catalyst.

As in the direct desulfurization catalyst, the spent FCC catalyst is desirably subjected to regeneration treatment for removal of carbonaceous material deposited on the surface by burning, in advance. In the spent catalyst, 90 to 6,900 ppm of vanadium and 80 to 3,300 ppm of nickel are usually accumulated on the surface thereof, and the specific surface area is usually in the range of 60 to 180 m²/g.

In the present invention, the aforementioned direct desulfurization catalyst and spent FCC catalyst are necessary to be used in admixture with each other. In connection with their mixing ratio, they are used in such a manner that the weight ratio of the direct desulfurization catalyst to the spent FCC catalyst is 3:97 to 80 preferably 5:95 to 70:30 and more preferably 10:90 to 60:40. If the amount of the direct desulfurization catalyst used is less than 3 wt % of the total weight of the direct desulfurization catalyst and the spent FCC catalyst, there is a danger of the yield of an intermediate fraction being low and the amount of coke formed being increased. On the other hand, if it is more than 80 wt %, the mechanical strength of the catalyst undesirably tends to decrease.

The amount of the above mixed catalyst used in hydrogenation of heavy oil is usually 0.5 to 20 wt %, preferably 2 to 15 wt % and more preferably 6 to 12 wt % based on the weight of the heavy oil. If the amount is less than 0.5 wt %, the hydrogenation effect is exhibited only insufficiently. On the other hand, if it is more than 20 wt %, solid-liquid separation after hydrogenation treatment becomes difficult, and a catalyst regeneration column is inevitably increased in size.

In the present invention, various catalysts conventionally used in hydrogenation of heavy oil can be used in a powder form in combination with the above mixed catalyst, if necessary, within a range that does not deteriorate the effects of the present invention.

Hydrogenation in the present invention is preferably carried out under conditions such that the reaction temperature is 350° to 480° C., the pressure is 50 to 300 kilograms per square centimeters.G (kg/cm².G), the liquid hourly space velocity (LHSV) is 0.2 to 1 hr⁻¹, the hydrogen partial pressure is 35 to 200 kg/cm².G, and the amount of consumption of hydrogen is 50 to 300 cubic meters per kiloliter oil (m³/kl oil).

In accordance with the process of the present invention, a heavy oil feed and the mixed catalyst and if necessary, a powdery hydrogenation catalyst are mixed, the resulting mixture is introduced into a reactor, and hydrogenation is carried out under the above reaction conditions. In this case, the reaction time is usually 10 minutes to 4 hours and preferably 30 minutes to 2 hours. The reaction mixture is first subjected to gas-liquid separation to separate a gaseous material containing hydrogen and lower hydrocarbons and then to solid-liquid separation to separate the catalyst and, thereafter, a product oil is recovered. Hydrogen and the catalyst separated can be reused, if necessary, after purification treatment and regeneration treatment.

In accordance with the process of the present invention, a middle distillate fraction having a boiling point falling within the range of 171° to 343° C. can be obtained in high yield and additionally, a vacuum gas oil having a boiling point within the rage of 343° to 525° C. can be obtained in good yield. On the other hand, the amount of coke (carbonaceous, toluene-insoluble portion) formed is small and can be controlled to about 5 wt % depending on conditions.

By suspending a mixture of a direct desulfurization catalyst and a spent FCC catalyst in a heavy oil feed and hydrogenating the heavy oil according to the process of the present invention, gasoline or a middle distillate fraction such as jet fuel, kerosene, light oil can be produced in high yield.

The catalyst to be used in the process of the present invention is inexpensive because it contains a spent catalyst. Moreover, the mixed catalyst consisting of a direct desulfurization catalyst and a spent FCC catalyst is improved in attrition resistance and decreased in catalyst loss, and further is excellent in activity as a hydrogenation catalyst. Accordingly, the process for hydrogenation of heavy oil using the above catalyst according to the present invention is greatly advantageous from an industrial standpoint.

The present invention is described in greater detail with reference to the following examples.

As the heavy oil feed to be used in Examples and Comparative Examples, Arabian heavy vacuum residual oil having the properties shown in Table 1 was used.

TABLE 1

| Specific Gravity | |
|---|---|
| 15/4° C. | 1.0295 |
| °API | 5.9 |
| Kinematic Viscosity (100° C.) (cSt) | 2680 |
| Sulfur Content (wt %) | 5.05 |
| Nitrogen Content (ppm) | 3150 |
| Metal Content V/Ni (ppm) | 127/41 |
| Clay (wt %) | — |
| Asphaltene (wt %) | 11.4 |
| Conradson Carbon Residue (wt %) | 21.7 |
| Salt Content (ppm) | 9 |
| Total Acid Value (mg KOH/g) | — |

Each yield and conversion are defined as follows.

Yield of Middle Distillate Fraction:

Proportion in weight of a fraction having boiling point of 171° to 343° C. to the oil feed.

Yield of Vacuum Gas Oil:

Proportion in weight of a fraction having boiling point of 343° to 525° C. to the oil feed.

Yield of Coke:

Proportion in weight of a carbonaceous and toluene-insoluble portion to the oil feed.

Conversion:

100—(yield of vacuum residual oil + yield of precipitated asphaltene) (wherein the yield of vacuum residual oil is a proportion of a fraction having boiling point of 525° C. or more to the oil feed and the yield of precipitated asphaltene is a proportion of a precipitated carbonaceous material insoluble in n-heptane but soluble in toluene to the oil feed).

EXAMPLE 1

2 g of a spent regenerated direct desulfurization catalyst in which 0.7 wt % of vanadium and 2.2 wt % of nickel were accumulated and which had a particle diameter of 30 to 200 micrometers ($\mu$m) and 8 grams (g) of a spent FCC catalyst in which 1,700 ppm of vanadium and 1,500 ppm of nickel were accumulated and which had a particle diameter of 30 to 200 $\mu$m were mixed. This mixed catalyst was introduced into an autoclave along with 90 g of Arabian heavy vacuum residual oil as a feed oil, and then the reaction was carried out under atmosphere of hydrogen at 450° C. and 85 kg/cm$^2$.G for one hour while stirring at 700 rpm.

After separation of the catalyst from the reaction mixture, the liquid product obtained was analyzed by boiling range distribution of petroleum fractions by gas chromatography to determine the yield of each of the formed middle distillate fraction and vacuum gas oil. The yield of coke was determined by rinsing the formed solids with toluene and acetone, drying and then burning at 550° C. in air.

The attrition resistance of the mixed catalyst was determined as follows.

45 g of the mixed catalyst was placed in an apparatus for use in determination of attrition resistance of FCC catalyst and flowed for 42 hours at room temperature at a linear speed of air of 267 meters per second (m/sec), and the weight ratio of the amount of catalyst lost during the period from more than 12 hours to 42 hours to the amount of the original catalyst (attrition index) was determined. The attrition resistance was indicated in terms of the above weight ratio. As the value is smaller, the attrition resistance is higher. The results are shown below.

Yield of middle distillate fraction: 34 wt %
Yield of vacuum gas oil: 22 wt %
Yield of coke: 5 wt %
Conversion: 83 wt %
Attrition index: 5 wt %/30 hrs

EXAMPLE 2

The procedure of Example 1 was repeated with the exception that 0.3 g of the spent direct desulfurization catalyst and 9.7 g of the spent FCC catalyst were used. The results are shown below.

Yield of middle distillate fraction: 32 wt %
Yield of vacuum gas oil: 16 wt %
Yield of coke: 11 wt %
Conversion: 91 wt %
Attrition index: 2 wt %/30 hrs

EXAMPLE 3

The procedure of Example 1 was repeated with the exception that 8 g of the spent direct desulfurization catalyst and 2 g of the spent FCC catalyst were used. The results are shown below.

Yield of middle distillate fraction: 33 wt %
Yield of vacuum gas oil: 21 wt %
Yield of coke: 6 wt %
Conversion: 87 wt %
Attrition index: 15 wt %/30 hrs

COMPARATIVE EXAMPLE 1

The procedure of Example 1 repeated with the exception that only 10 g of the spent FCC catalyst was used as the catalyst. The results are shown below.

Yield of middle distillate fraction: 26 wt %
Yield of vacuum gas oil: 12 wt %
Yield of coke: 22 wt %
Conversion: 85 wt %
Attrition index: 2 wt %/30 hrs

COMPARATIVE EXAMPLE 2

The procedure of Example 1 was repeated with the exception that only 10 g of the spent direct desulfurization catalyst was used as the catalyst. The results are shown below.

Yield of middle distillate fraction: .34 wt %
Yield of vacuum gas oil: 21 wt %
Yield of coke: 7 wt %
Conversion: 90 wt %
Attrition index: 40 wt %/30 hrs

COMPARATIVE EXAMPLE 3

The procedure of Example 1 was repeated with the exception that only 2 g of the spent direct desulfurization catalyst was used as the catalyst. The results are shown below.

Yield of middle distillate fraction: 29 wt %
Yield of vacuum gas oil: 19 wt %
Yield of coke: 10 wt %
Conversion: 81 wt %
Attrition index: 40 wt %/30 hrs

EXAMPLE 4

The procedure of Example 1 was repeated with the exception that, as a fresh direct desulfurization catalyst, 2 grams of alumina catalyst in which 6.7 wt % of molybdenum and 1.7 wt % of nickel were supported, and 8 grams of a spent FCC catalyst were used. The results are shown below.

Yield of middle distillate fraction: 32 wt %
Yield of vacuum gas oil: 20 wt %
Yield of coke: 8 wt %
Conversion: 83 wt %
Attrition index: 4 wt %/30 hrs

COMPARATIVE EXAMPLE 4

The procedure of Example 1 was repeated with the exception that 2 grams of the fresh direct desulfurization catalyst of Example 4 was used as the catalyst. The results are shown below.

Yield of middle distillate fraction: 30 wt %
Yield of vacuum gas oil: 18 wt %
Yield of coke: 12 wt %
Conversion: 84 wt %
Attrition index: 35 wt %/30 hrs

COMPARATIVE EXAMPLE 5

The procedure of Example 1 was repeated with the exception that in place of the spent FCC catalyst of Example 1, there was used 8 grams of a spent FCC catalyst which was obtained by treating a fresh FCC catalyst at a temperature of 900° C. and steam partial pressure of 20 vol. % for a week and therefore could not pick up vanadium, nickel and iron. The results are shown below.

Yield of middle distillate fraction: 34 wt %
Yield of vacuum gas oil: 22 wt %
Yield of coke: 5 wt %
Conversion: 83 wt %
Attrition index: 5 wt %/30 hrs.

EXAMPLE 5

The procedure of Example 1 was repeated with the exception that 5 grams of the spent direct desulfurization catalyst and 5 grams of the spent FCC catalyst were used, The results are shown below.

Yield of middle distillate fraction: 34 wt %

Yield of vacuum gas oil: 19 wt %
Yield of coke: 6 wt %
Conversion: 87 wt %
Attrition index: 12 wt %/30 hrs.

COMPARATIVE EXAMPLE 6

The procedure of Example 5 was repeated with the exception that, as the spent FCC catalyst, 5 grams of the spent FCC catalyst in which 2.0 wt % of molybdenum was supported were used. The results are shown below.
Yield of middle distillate fraction: 30 wt %
Yield of vacuum gas oil: 18 wt %
Yield of coke: 8 wt %
Conversion: 86 wt %
Attrition index; 12 wt %/30 hrs.

COMPARATIVE EXAMPLE 7

The procedure of Example 5 was repeated with the exception that, 5 grams of silica-alumina catalyst in which 3.0 wt % of nickel and 8 wt % of molybdenum were supported and has silica content of 55.9 wt % were used. The results are shown below.
Yield of middle distillate fraction: 27 wt %
Yield of vacuum gas oil; 17 wt %
Yield of coke: 12 wt %
Conversion: 87 wt %
Attrition index: 15 wt %/30 hrs.

We claim:

1. A process for hydrogenating a heavy oil which comprises contacting the heavy oil with hydrogen and a solid catalyst suspended in said heavy oil, said solid catalyst being a mixture of a direct desulfurization catalyst and a spent FCC catalyst which is free of molybdenum.

2. The process as claimed in claim 1 wherein the weight ratio of the direct desulfurization catalyst to the spent FCC catalyst is 3:97 to 80:20.

3. The process as claimed in claim 1 wherein the direct desulfurization catalyst is a fresh catalyst or a spent catalyst or a mixture thereof.

4. The process as claimed in claim 1 wherein the direct desulfurization catalyst is a spent catalyst being subjected to a regeneration treatment before being used and having 0.7 to 20 wt % of vanadium and 0.2 to 10 wt % of nickel which are accumulated on the surface of the catalyst.

5. The process as claimed in claim 1 wherein the FCC spent catalyst is a catalyst being subjected to a regeneration treatment before being used and having 90 to 6,900 ppm of vanadium and 80 to 3,300 ppm of nickel which are accumulated on the surface of the catalyst.

6. The process as claimed in claim 1 wherein the direct desulfurization catalyst is a spent catalyst being subjected to a regeneration treatment before being used and having 0.7 to 20 wt % of vanadium and 0.2 to 10 wt % of nickel which are accumulated on the surface of the catalyst.

7. The process as claimed in claim 6, wherein said FCC catalyst is a crystalline alumino-silicate having the general formula $Na_2O \cdot Al_2O_3 \cdot nSiO_2$, wherein the $SiO_2/Al_2O_3$ molar ratio is between 2.5:1 and 4:8:1.

8. The process as claimed in claim 1 wherein said desulfurization catalyst has a surface area between 40 and 200 $m^2/g$.

9. The process as claimed in claim 1, wherein said catalyst mixture is used in an amount between 0.5 to 20 wt %, based on the weight of heavy oil being treated.

10. The process as claimed in claim 5, wherein said catalyst mixture is used in an amount between 2 to 15 wt %, based on the weight of heavy oil being treated.

11. The process as claimed in claim 7, wherein said catalyst mixture is used in an amount between 6 to 12 wt %, based on the weight of heavy oil being treated.

12. The process as claimed in claim 5, wherein the hydrogenating process is conducted at a temperature of 350° to 480° C. and at a pressure of 50 to 300 $Kg/m^2$-G; and wherein the liquid hourly space velocity of heavy oil used in said hydrogenating process is 0.2 to 1 $hr^{-1}$, the hydrogen partial pressure is 35 to 200 $Kg/m^2$-G, and the consumption of hydrogen is 50 to 300 $m^3$/Kl of heavy oil processed.

13. The process as claimed in claim 12, wherein the reaction time for said process is 10 minutes to 4 hours.

14. The process according to claim 10, wherein the reaction time for said process is 20 minutes to 2 hours.

15. The process according to claim 5, wherein the weight ratio of direct desulfurization catalyst to spent FCC catalyst is between 5:95 to 70:30.

16. The process according to claim 1, wherein at least 80% of the heavy oil processed is converted to a hydrogenated product.

17. A process for hydrogenating heavy oil which comprises contacting the heavy oil with hydrogen and a solid catalyst suspended in said heavy oil, said solid catalyst being a mixture of a direct desulfurization catalyst and a spent FCC catalyst which is free of molybdenum, with said direct desulfurization catalyst having 0.7 to 20 wt. % of vanadium and 0.2 to 10 wt % of nickel accumulated on the surface thereof and, when said desulfurization catalyst is a spent catalyst, being regenerated before being used, and with said spent FCC catalyst being subjected to a regeneration treatment before being used and having 90 to 6,900 ppm vanadium and 80 to 3,300 ppm of nickel accumulated on the surface thereof, with the weight ratio of said desulfurization catalyst to said FCC catalyst in the mixture being between 3:97 and 80:20, with the amount of mixed catalyst used in said hydrogenation product process being 0.5 to 20 wt %, based on the weight of heavy oil being processed, said process being conducted at a temperature of 350° to 480° C. with a liquid hourly space velocity of 0.2 to 1 $hour^{-1}$, at a pressure of 50 to 300 $kg/m^2$-G, with a partial pressure of hydrogen being 35 to 200 $kg/m^2$-G and with a consumption of hydrogen being 50 to 300 $m^3$/kl of heavy oil processed, the reaction time of said process being between 10 minutes and 4 hours, with at least 80% of the heavy oil being converted to a hydrogenated product.

18. A process for hydrogenating a heavy oil which comprises contacting the heavy oil with hydrogen and a solid catalyst suspended in said heavy oil, said solid catalyst being a mixture of a direct desulfurization catalyst and a spent FCC catalyst, said direct desulfurization catalyst having 0.7 to 20 wt % of vanadium and 0.2 to 10 wt % of nickel accumulated on the surface thereof and having a specific surface area between 40 and 200 $m^2/G$, and, when said desulfurization catalyst is a spent catalyst, being regenerated before being used, and with said spent FCC catalyst consisting of a crystalline alumino-silicate having the general formula $Na_2O \cdot Al_2O_3 \cdot SiO_2$, wherein the $Al_2O_3/SiO_2$ molar ratio is 2.5:1 to 4.8:1 which is subjected to a regeneration process before being used and with a 90 to 6,900 ppm vanadium and 80 to 3,300 ppm nickel accumulated on the surface thereof, with the weight ratio of said desulfurization catalyst to said spent FCC catalyst being between 10:90 and 70:30, with the amount of mixed catalyst used being 6–12 wt %, based on the amount of heavy oil being processed, said process being conducted at a temperature of 350° to 480° C. with a liquid hourly space velocity of 0.2 to 1 hr$^{-1}$, and at a pressure of 50 to 300 kg/cm$^2$-G, with a partial pressure of hydrogen being 35 to 200 kg/cm$^2$-G and with a consumption of hydrogen being 50 to 300 m$^3$/kl of heavy oil processed, the reaction time of said process being between 20 minutes and 2 hours with at least 90% of the heavy oil being converted to a hydrogenated product.

19. The process as claimed in claim 5, wherein said FCC catalyst is selected from the group consisting of activated clay, synthetic silica-alumina, silica-magnesium, high alumina content silica alumina and zeolite.

20. The process as claimed in claim 17, wherein said FCC catalyst is selected from the group consisting of activated clay, synthetic silica-alumina, silica-magnesium, high alumina content silica alumina and zeolite.

21. The process as claimed in claim 1, wherein the process is conducted in a suspension bed system, the direct desulfurization catalyst has a particle size of 30 to 200 μm and the spent FCC catalyst has a particle size of 30 to 200 μm.

* * * * *